June 1, 1965 H. MAGNUSSEN 3,186,452
GUIDE TRACK FOR PNEUMATIC AND ELECTRIC PORTABLE CIRCULAR SAWS
Filed Feb. 19, 1963 3 Sheets-Sheet 1
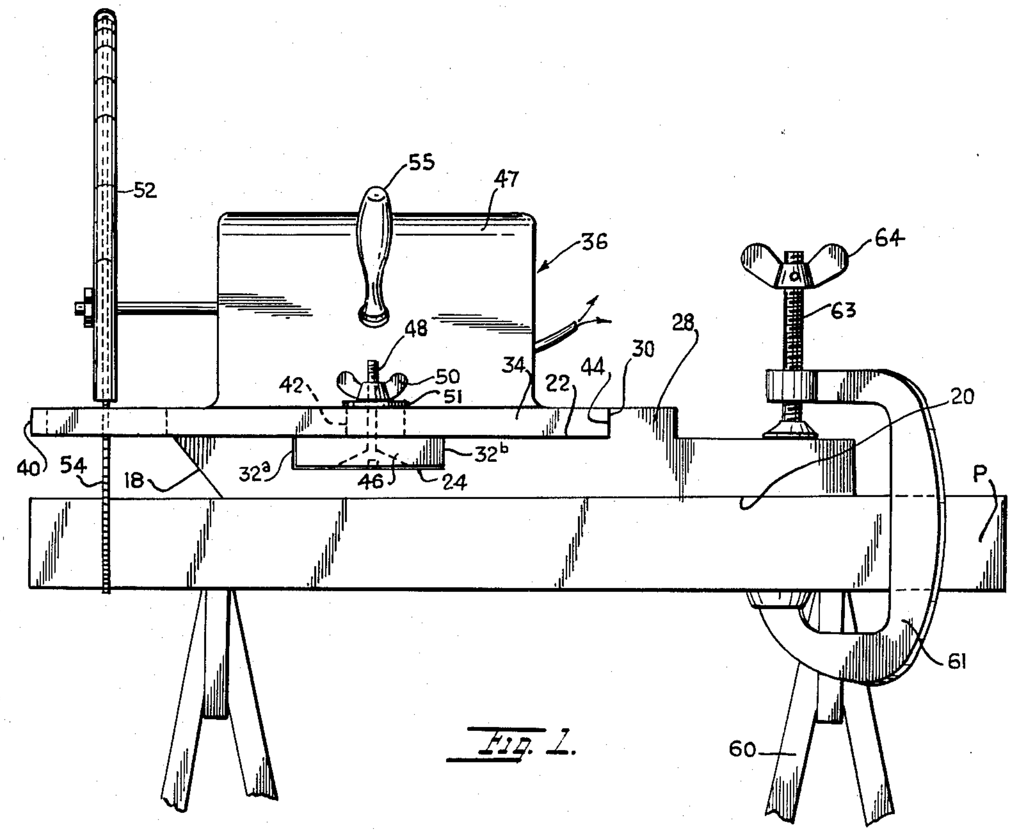
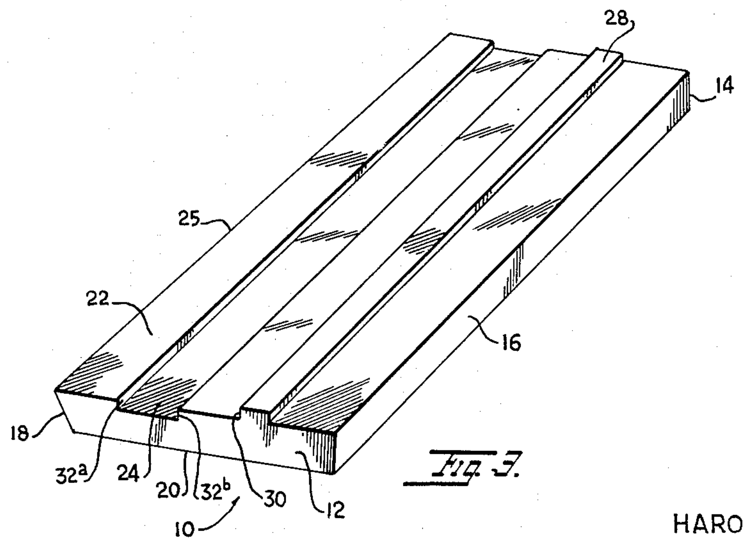
INVENTOR.
HAROLD MAGNUSSEN
BY
Zoltan Polachek
ATTORNEY

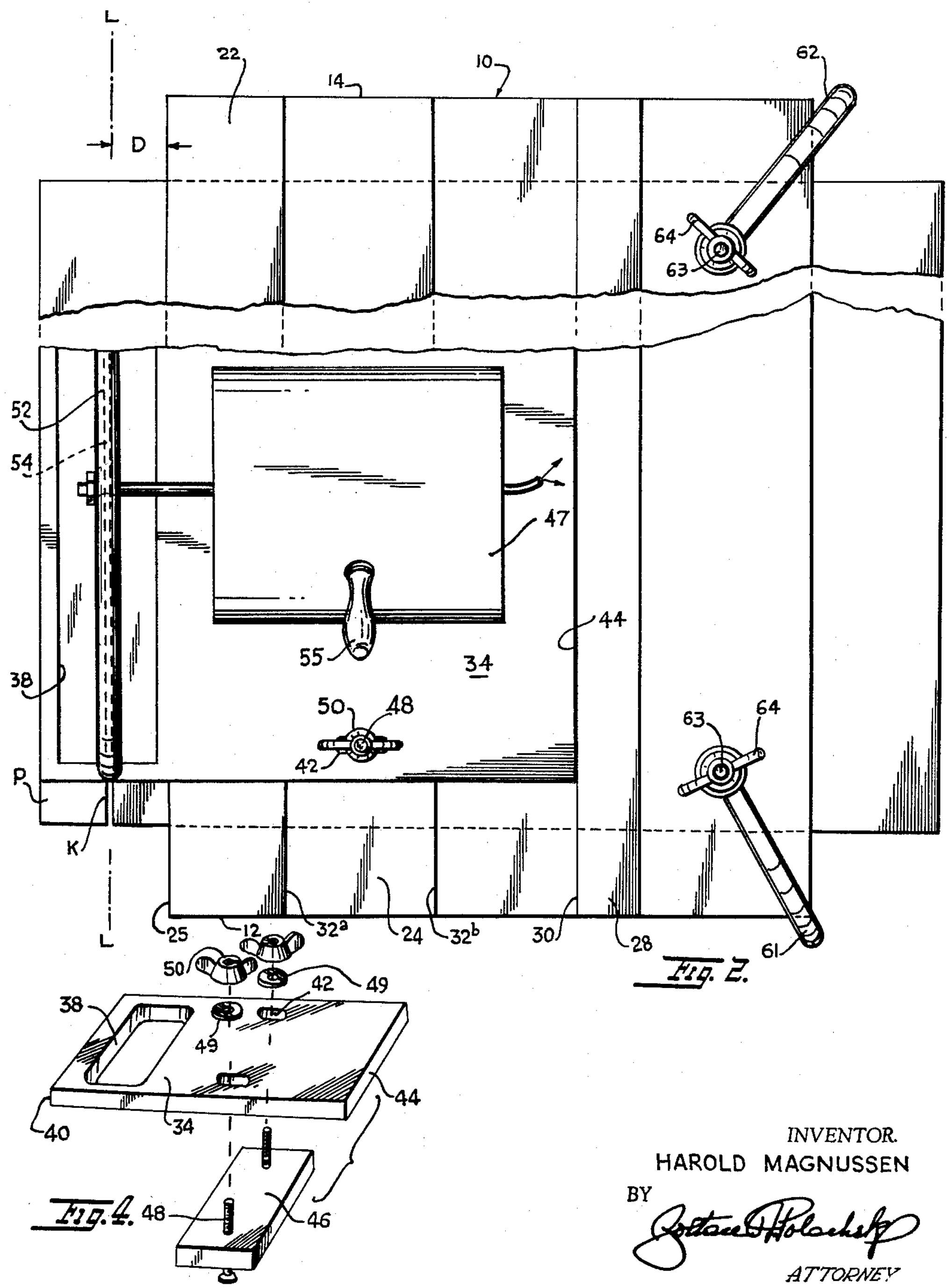
INVENTOR.
HAROLD MAGNUSSEN
BY
ATTORNEY

INVENTOR.
HAROLD MAGNUSSEN
BY
Zoltan Polachek
ATTORNEY

United States Patent Office 3,186,452
Patented June 1, 1965

1

3,186,452
GUIDE TRACK FOR PNEUMATIC AND ELECTRIC PORTABLE CIRCULAR SAWS

Harold Magnussen, 55 Tieman Place, New York, N.Y.

Filed Feb. 19, 1963, Ser. No. 259,610
1 Claim. (Cl. 143—47)

This invention concerns a novel track for supporting and guiding a portable power operated hand circular saw in cutting large plates, panels, and the like.

In factories, machine shops, shipyards and other places where large aluminum plates are fabricated into various structural shapes, it is often necessary to square off or bevel the edges of the plates, or to trim certain parts thereof.

The procedure conventionally employed where large plates are to be cut, involves lifting a plate by means of an overhead crane and conveying the plate to a planing machine. Such a conveying operation requires the services of a crane operator to control the crane, at least two riggermen to handle the plate and a machinist to operate the planing machine or planer. If all edges of the plate have to be planed square or beveled, three or more lifts by the overhead crane is required. While the plate is being lifted and conveyed to the planer, the machinist is standing by and is also standing by when he has finished planing the first edge of the plate and when ready to plane the next edge of the plate as the crane operator and rigger are busy performing other lifts in the building and are not available at the time the machinist is ready to perform his next operation. Thus the services of four men plus a crane and planer are required to accomplish the task of cutting four edges of a plate. In the present invention this costly use of apparatus and labor is materially reduced. Repeated lifts of the plate are avoided.

According to the invention, a guide track is provided which permits use of a portable saw assembly to accomplish the cutting of large plates without repeated lifts, and by use of only a single operator.

The invention has further utility in connection with the trimming of small plates when portable saws are employed. Heretofore, small plates to be cut are marked with a chalk or scriber to indicate the line to be cut and the operator pushes the portable saw manually along the marked line. When a portable saw is pushed along a marked line and is guided only by hand, some lateral motion occurs which causes the saw blade to bind and jam. As a result, the saw blade wears rapidly. Saw blades having carbide cutting teeth are very costly so that rapid wear of such blades is to be avoided. The present invention provides a guide track which insures that the portable saw used in cutting the plate moves straight and true. The saw blade thus cuts freely without binding or jamming. The saw blade lasts longer. The motor of the saw also lasts longer. Overheating of the motor due to repeated overloading is avoided.

According to the present invention, the guide track has a rectangular structure and is preferably made of aluminum or other light metal. It could even be made of reinforced polyester plastic or the like.

It is therefore a principal object of the invention to provide a guide track for a portable saw assembly useful in cutting aluminum, plastic or plywood panels, boards, sheets and the like.

Another object is to provide a rectangular track plate with appropriate grooves or tracks for guiding a portable saw assembly while cutting a board or a plate.

For further comprehension of the invention, and of the objects and advantages thereof, reference will be had to the following description and accompanying drawings, and to the appended claim in which the various novel features of the invention are more particularly set forth.

2

In the accompanying drawings forming a material part of this disclosure:

FIG. 1 is an end elevational view of a supporting and guiding device for a portable power operated circular saw embodying the invention, shown mounted on a panel or plate being cut thereby.

FIG. 2 is a top plan view of the device shown in FIG. 1, parts being broken away.

FIG. 3 is a perspective view of the bed plate, on a reduced scale.

FIG. 4 is an exploded perspective view on a reduced scale of a saw mounting guide plate and slide plate employed in the invention.

Figure 5:
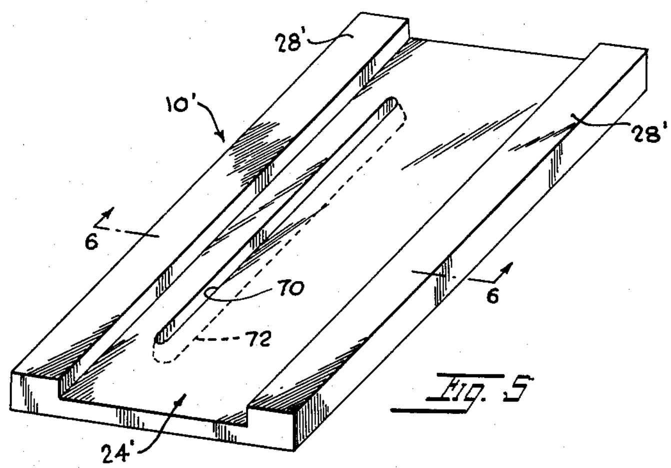
FIG. 5 is a view similar to FIG. 3 of a bed plate embodying a modified form of the invention.

Referring to the drawings, there is shown bed 10 embodying the invention. This bed is a flat rectangular plate with opposite parallel vertical end edges 12, 14. The bed has a flat vertical lateral edge 16 perpendicular to edges 12, 14. The other lateral edge 18 of the bed is beveled and disposed at an angle of 135° to the flat bottom 20 of the bed. The edge 18 is disposed 45° to the flat top surface 22 of the bed.

A flat shallow rectangular groove 24 is formed in the top surface of the bed. This groove is spaced laterally from the wedge or knife edge 25 of the bed. A ridge 28 extends upwardly from the plane of surface 22 and is spaced laterally from groove 24. The groove 24 and ridge 28 extend from end-to-end of the bed.

Ridge 28 has a straight, flat vertical wall 30 parallel to edge 25 and the opposite vertical sides 32[a], 32[b] of groove 24.

A rectangular mounting plate or base plate 34 for a motorized saw assembly 36 is provided for use with bed 10. Plate 34 has an elongated slot 38 near one edge 40. Two elongated holes 42 are provided intermediate the ends; see FIG. 4.

A slide plate 46 is provided with bolts 48 which extend upwardly through elongated transverse slots 42 in plate 34. This permits adjustment of the plate 46 toward and away from the center of plate 34. Wing nuts 50 and washers 49 engage on bolts 48 and hold plate 46 in adjusted position.

The saw assembly 36 has a housing 47 enclosing a motor (not shown), blade guard 52 and rotary blade 54. A handle 55 secured to the housing serves for use in guiding the saw assembly.

FIGS. 1 and 2 show the bed 10 mounted on a work plate P which is to be cut by the saw blade 54. The blade forms a cut K in the plate P. The plate P rests horizontally on wood or metal horses 60.

Large C-clamps 61, 62 with screw 63 and nut 64 assemblies secure the bed 10 to plate P. The bed is located so that the saw blade 54 will move along the cutting line L—L while the plate 46 moves along the groove 24.

Any plate or panel of any size can be cut by the saw assembly when used with the present device. The plate work P will be set up on horses 60 by a crane or manually if it is of small size. The bed 10 will then be set on the plate P. Edge 25 will be located a predetermined distance D from line L—L. This distance is equal to the distance of edge 25 from the median plane of saw blade 54. The plate 34 carrying slider plate 46 will then be mounted on bed 10 with plate 46 inserted into groove 24. Edge 44 of plate 34 will be abutted to edge 30 of ridge 28. It will be apparent that as the handle 55 is grasped by the operator and the plate 34 is pushed along the bed 10, plate 34 will be guided by the the slider 46 engaging the bottom and sides of groove 24.

Figure 6:
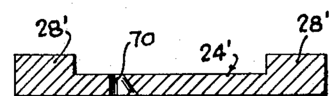
FIG. 6 is a cross-sectional view of the line 6—6 of FIG. 5.

In FIGS. 5 and 6, a modified form of bed 10' is shown. In this form of bed, the rectangular body of the bed is formed with ridges 28' along both long edges, the ridges and body defining a single flat rectangular-shaped shallow groove 24'. An elongated closed slot 70 is formed in the body of the bed, ending remote from both ends of the body and disposed laterally of the longitudinal center of the body. One edge wall 72 of the slot is slanted outwardly as shown in FIG. 6.

This modified construction of bed permits the saw housing 47 to be disposed horizontally with the blade of saw assembly 36 disposed truly vertical through the slot 70. However, the housing may be mounted at an angle to the horizontal and the saw blade disposed at an angle to the vertical. In such event, the dimensions of the slot 70 are such and the angularity of the edge wall 72 is such that the blade 54 is adapted to extend through the slot 70.

The beds 10 and 10' are of lightweight metal or plastic and can easily be turned around by one man for cutting or trimming other edges or parts of the beds 10 and 10'.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A device for supporting and guiding a portable power operated circular saw comprising an elongated rectangular bed pate which is provided with a flat under surface and is adapted to be removably secured in fixed position on a work piece, one side edge of said bed plate being inclined downwardly and inwardly from the upper surface of said bed plate, a single relatively wide shallow rectangular groove which is formed in the upper surface of said bed plate and extends from end to end of said bed plate adjacent to and parallel to the said one side thereof, an elongated upwardly extending narrow rib which is integral with said bed plate and extends from end to end thereof between said groove and the other side edge of said bed plate parallel to said groove; a thin flat rectangular mounting plate which is slidably mounted on said bed plate over said groove with one end thereof in engagement with said rib and the other end thereof extending out beyond the said one side edge of said bed plate in overhanging relation to a work piece to which said bed plate is secured, an elongated slot in the said overhanging end of said mounting plate, said mounting plate being adapted to have a portable power operated circular saw secured thereto with the blade thereof extending downwardly through said slot for engagement with said work piece; and a single rectangular slide plate which is adjustably secured to the under surface of said mounting plate for transverse lateral adjustment of said mounting plate with respect to said rib, and is disposed in said groove with the opposed side edges thereof slidably engaging the opposed sides of said groove.

References Cited by the Examiner

UNITED STATES PATENTS

| | | | |
|---|---|---|---|
| 1,960,590 | 5/34 | McKay | 143—6 |
| 2,581,766 | 1/52 | McConnell | 143—43 |
| 2,629,410 | 2/53 | Cadwell | 143—47 |
| 2,708,465 | 5/55 | Huebner et al. | 143—47 |
| 2,949,139 | 8/60 | Nolte | 143—6 |
| 3,073,360 | 1/63 | Villanueva | 143—6 |

LESTER M. SWINGLE, *Primary Examiner.*

WILLIAM W. DYER, Jr., *Examiner.*